United States Patent [19]
Higuchi et al.

[11] Patent Number: 5,646,705
[45] Date of Patent: Jul. 8, 1997

[54] ELECTRODE STRUCTURE OF LIQUID CRYSTAL DISPLAY DEVICE AND METHOD OF MANUFACTURING THE LIQUID CRYSTAL DISPLAY DEVICE

[75] Inventors: Toyoki Higuchi; Hideo Kawano, both of Yokohama; Makoto Shibusawa, Odawara, all of Japan

[73] Assignee: Kabushiki Kaisha Toshiba, Kawasaki, Japan

[21] Appl. No.: 555,223

[22] Filed: Oct. 31, 1995

Related U.S. Application Data

[63] Continuation of Ser. No. 950,719, Sep. 25, 1992, abandoned.

[30] Foreign Application Priority Data

Sep. 26, 1991 [JP] Japan ................. 3-246390

[51] Int. Cl.$^6$ ................. G02F 1/136; G02F 1/1343
[52] U.S. Cl. ................. 349/143; 349/43; 349/126; 349/146
[58] Field of Search ................. 359/54, 59, 87; 345/90, 92; 257/59, 72; 349/140, 143, 146, 43, 132, 126

[56] References Cited

U.S. PATENT DOCUMENTS

| | | | |
|---|---|---|---|
| 4,824,213 | 4/1989 | Morokawa | 359/87 |
| 5,034,795 | 7/1991 | Henry | 359/74 |
| 5,191,453 | 3/1993 | Okumura | 359/59 |
| 5,245,452 | 9/1993 | Nakamura et al. | 359/59 |
| 5,309,264 | 5/1994 | Lien et al. | 359/87 |
| 5,313,075 | 5/1994 | Zhang et al. | 359/79 |
| 5,337,172 | 8/1994 | Lehureau | 359/87 |

FOREIGN PATENT DOCUMENTS

| | | | |
|---|---|---|---|
| 0390225 | 10/1985 | European Pat. Off. | |
| 0375268 | 6/1990 | European Pat. Off. | |
| 0445777 | 9/1991 | European Pat. Off. | |
| 61-121087 | 6/1986 | Japan | |
| 62-69238 | 3/1987 | Japan | 359/59 |
| 0137619 | 6/1991 | Japan | 359/74 |
| 3280014 | 12/1991 | Japan | |
| 3293639 | 12/1991 | Japan | 359/59 |

*Primary Examiner*—William L. Sikes
*Assistant Examiner*—Tai V. Duong
*Attorney, Agent, or Firm*—Cushman Darby & Cushman IP Group of Pillsbury Madison & Sutro, LLP

[57] ABSTRACT

In a liquid crystal display device according to the invention, one of electrodes holding a liquid crystal composition therebetween is formed by a shading conductor having light-transmitting holes or slits. The display device of the invention can reduce a required amount of indium (In), a rare metal, and can have a high light transmittance.

27 Claims, 11 Drawing Sheets

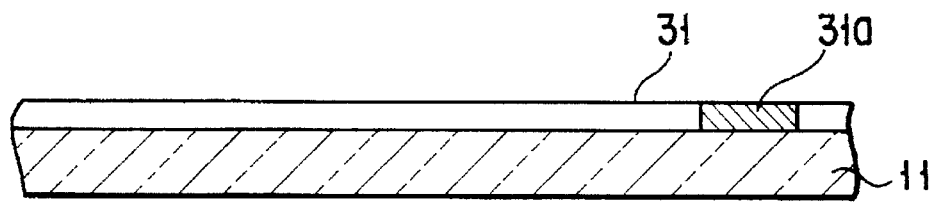
F I G. 3A
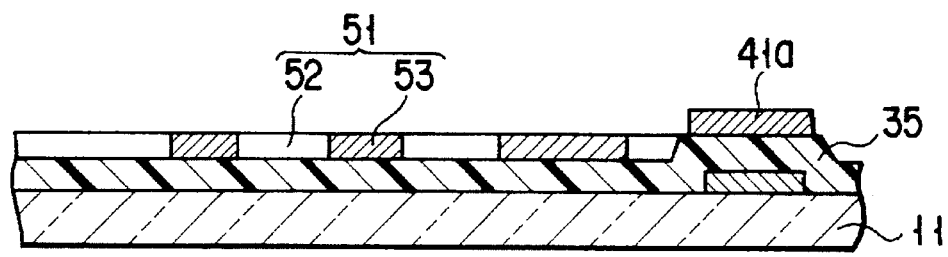
F I G. 3B
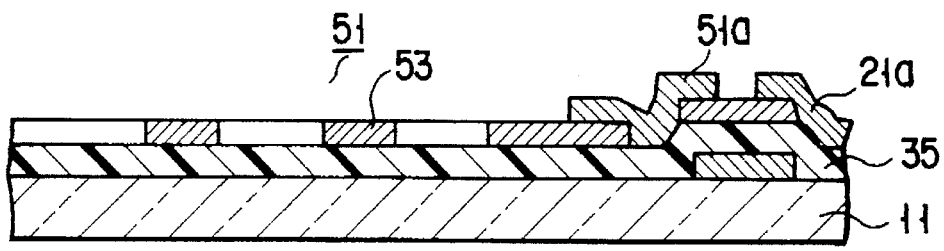
F I G. 3C
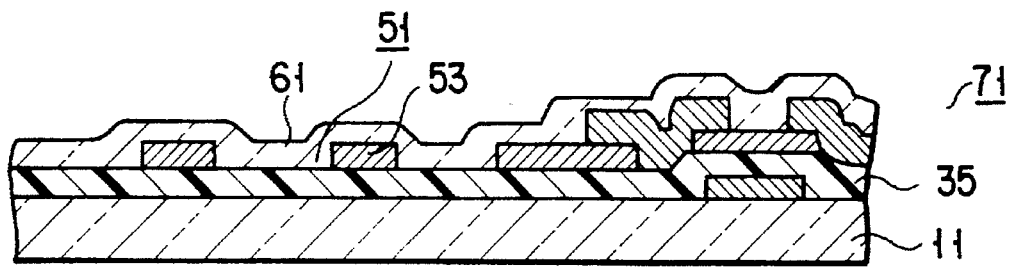
F I G. 3D

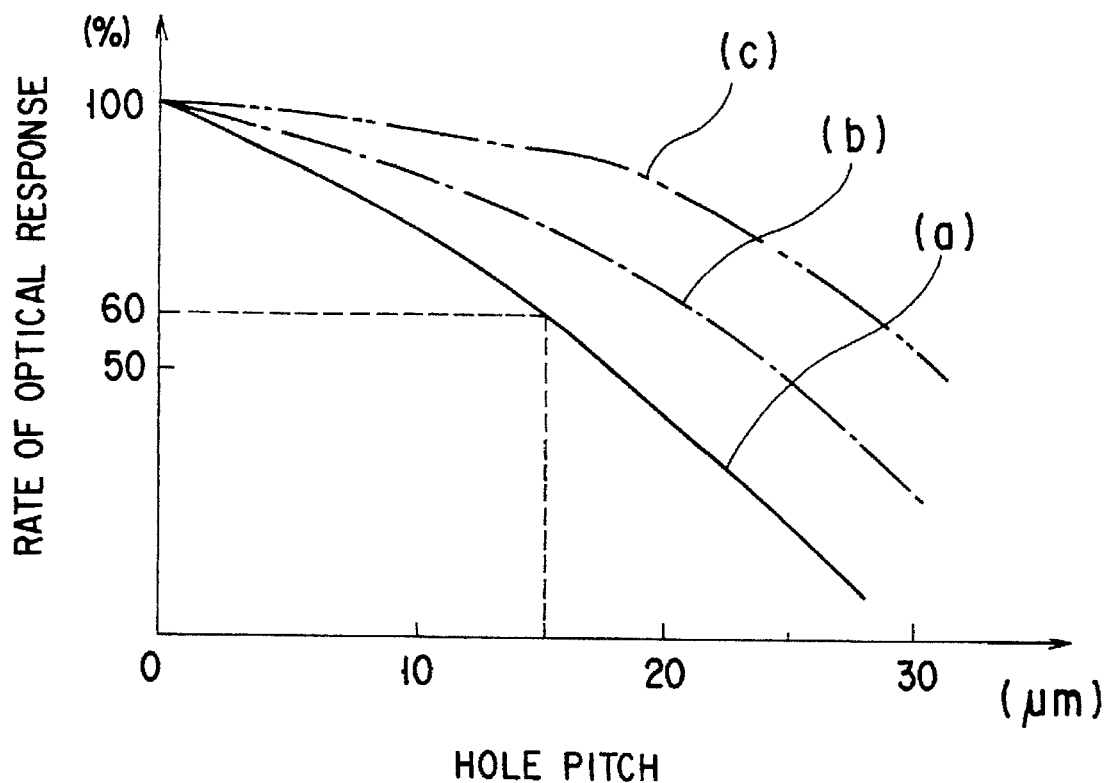
F I G. 11

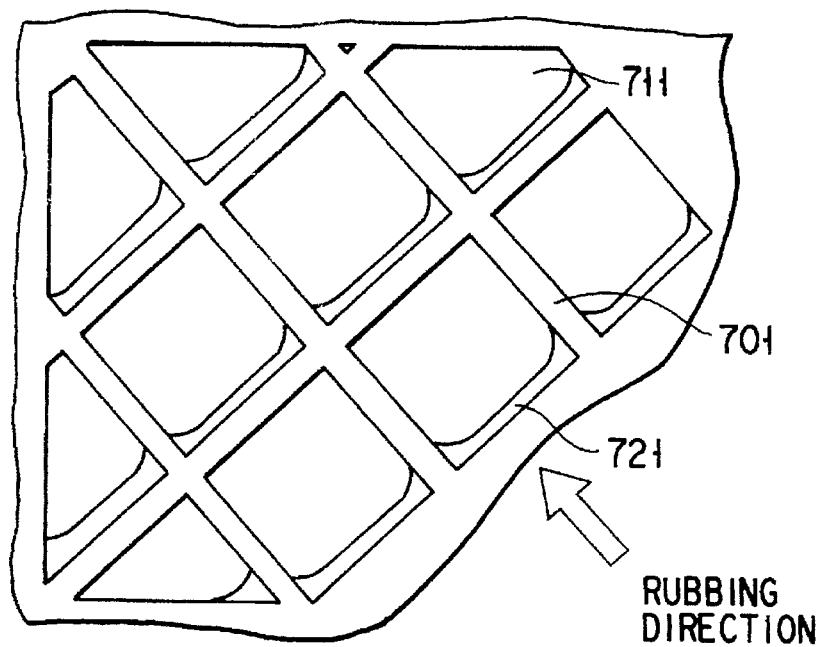
F I G. 12
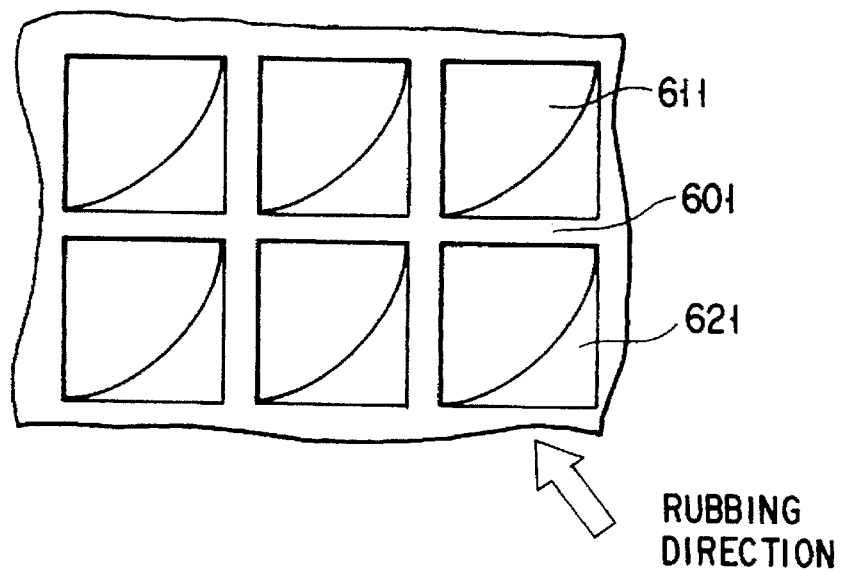
F I G. 13

ELECTRODE STRUCTURE OF LIQUID CRYSTAL DISPLAY DEVICE AND METHOD OF MANUFACTURING THE LIQUID CRYSTAL DISPLAY DEVICE

This is a continuation of application Ser. No. 07/950,719, filed on Sep. 25, 1992, which was abandoned upon the filing hereof.

BACKGROUND OF THE INVENTION

1. Field of the Invention

This invention relates to a liquid crystal display device having a liquid crystal composition held between a pair of electrodes and a method of manufacturing the liquid crystal display device, and more particularly to an improvement in the electrode structure of a liquid crystal display device.

2. Description of the Related Art

Recently, liquid crystal display devices have been used as TV or graphic display devices in various technical fields, since they are compact, light, and of low power consumption.

Various types of liquid crystal display devices are available, for example, a simple matrix type display device employing pairs of stripe electrodes arranged in the form of matrix, and a liquid crystal composition held between each pair of stripe electrodes; an active matrix type display device employing a switching element provided for each display pixel.

In each of the liquid crystal display devices, it is necessary to make at least one electrode substrate of each electrode pair transparent. That is, in each pair, at least one electrode must be light transmissible, as well as its substrate.

As transparent materials for the electrode, an NESA (stannic oxide) film and an I.T.O. (Indium Tin Oxide) film are well known. In particular, demand for an I.T.O. film as a transparent electrode material has increased, since it can be easily patterned in a photoetching process or the like, as compared with other transparent electrode materials, and it has a high light transmittance and electrical conductivity.

However, the I.T.O. film contains indium (In), which is a very rare metal, and which is hard to collect. Therefore, development of transparent electrode materials to be used in place of the I.T.O. film have actively been pursued these years. Further, development of a liquid crystal display device has been requested, which has an electrode structure made of a low-cost material in place of I.T.O. and having a high light transmittance.

SUMMARY OF THE INVENTION

It is the object of the invention to provide a liquid crystal display device of an electrode structure made of a low-cost material in place of the I.T.O. film and having a high light transmittance.

According to a first aspect of the invention, there is provided a liquid crystal display device having a plurality of pixel elements which are arranged in an array controlling light rays, respectively, comprising:

a first substrate;

a first electrode structure formed on the first substrate, and having first surface regions arranged in the array;

a second substrate located opposed to the first substrate with a gap interposed therebetween;

a second electrode structure having second surface regions, which are arranged in the array and opposed to the first surface regions, one of the first and second electrode structures being made of a material for preventing the light rays from passing through corresponding surface regions, and having an opening structure with a plurality of openings for passing the light rays therethrough; and a liquid crystal composition filled in the gap between the first and second substrates, the liquid crystal composition, and first and second surface regions defining the pixel elements.

According to a second aspect of the invention, there is provided a liquid crystal display device comprising:

a first substrate;

a second substrate opposed to the first substrate with a gap interposed therebetween;

a plurality of pixel elements arranged in a array, each of the pixel elements being formed between the first and second substrates to control passing of corresponding light rays, each pixel element including a first electrode structure formed on the first substrate and having a first electrode pixel region, a second electrode structure formed on the second substrate, and having a second electrode pixel region opposed to the corresponding first electrode pixel region, at least one of the first and second electrode structures including a pixel electrode structure which is made of a material for preventing the light rays from passing through the corresponding electrode pixel region, and has a plurality of openings for allowing the light rays to pass therethrough; and a liquid crystal composition filled in the gap between the first and second substrates.

According to a third aspect of the invention, there is provided a simple matrix type liquid crystal display device having a plurality of pixel elements which are arranged in an array for controlling light rays, respectively, comprising:

a first substrate;

a second substrate opposed to the first substrate with a gap interposed therebetween;

a plurality of first electrodes arranged on the first transparent substrate in substantially parallel with one another, and made of a material for shading the light rays, the first electrodes having first regions which have a plurality of openings formed therein and correspond to pixel elements;

a plurality of second electrodes arranged on the second substrate in substantially parallel with one another, and having second regions which pass the light rays therethrough and correspond to pixel elements; and a liquid crystal composition filled in the gap between the first and second electrodes.

According to a fourth aspect of the invention, there is provided an active matrix type liquid crystal display device having a plurality of pixel elements arranged in an array for controlling light rays, respectively, comprising:

a first substrate;

a second substrate opposed to the first substrate with a gap interposed therebetween;

switching elements arranged in the array and formed on said first substrate, each switching element including a gate electrode electrically, an insulating layer formed on the gate electrode, a semiconductor layer formed on the insulating layer and source and drain electrodes;

a plurality of scanning lines arranged on the first substrate in substantially parallel with one another and connected to the corresponding gate electrodes of said switching elements;

a plurality of signal lines arranged in substantially parallel with one another, electrically insulated from said scanning lines and the gate electrodes of said switching elements and connected to the corresponding drain electrodes of said switching elements;

pixel electrode structures arranged in the array, electrically insulated from said signal and scanning lines, the gate and drain electrodes of said switching elements, each pixel electrode structure including a display electrode layer which is made of a material for shading the light rays, and has a plurality of openings for allowing the light rays to pass therethrough;

a common electrode having a region corresponding to pixel elements formed on the second substrate and passing the light rays therethrough; and a liquid crystal composition filled in the gap between the pixel electrodes and common electrode, According to a fifth aspect of the invention, there is provided a method of manufacturing an active matrix type liquid crystal display device having a plurality of pixel elements arranged in an array for controlling light rays, respectively, comprising:

the step of forming a first liquid crystal substrate structure, said step including:

the step of forming a plurality of scanning lines on a surface of a first substrate in substantially parallel with one another, and forming gate electrodes of switching elements extending from the scanning lines;

the step of coating the gate electrodes with a insulating film;

the step of forming a semiconductor layer on the insulating film and patterning the semiconductor layer to form semiconductor elements of the switching elements on switching regions of the insulating film and pixel electrodes on pixel regions at the surface side of the substrate film, each of the pixel electrodes having a plurality of openings for allowing the light rays to pass therethrough;

the step of forming source and drain electrodes and signal lines on the insulating layer, the source electrodes being electrically connected to the corresponding signal line and each of the drain electrodes being connected to the corresponding pixel electrodes; and the step of coating the pixel electrodes with an orientation film.

According to a six aspect of the invention, there is provided a method of manufacturing an active matrix type liquid crystal display device having a plurality of pixel elements arranged in an array for controlling light rays, respectively, comprising:

the step of forming a first liquid crystal substrate structure, said step including:

the step of forming a plurality of scanning lines on a surface of a first substrate in substantially parallel with one another, and forming gate electrodes of switching elements extending from the scanning lines;

the step of coating the scanning lines, gate electrodes and first substrate with a insulating film;

the step of forming semiconductor elements on the insulating film;

the step of forming a conductive layer on the insulating film and the semiconductor elements and patterning the conductive layer to form source and drain electrodes of the switching elements on the semiconductor elements and pixel electrodes on pixel regions at the surface side of the insulating film, each of the pixel electrodes having a plurality of openings for allowing the light rays to pass therethrough, the source electrodes being electrically connected to the corresponding signal line and each of the drain electrodes being connected to the corresponding pixel electrodes; and the step of coating the pixel electrodes with an orientation film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A to 3D are cross-sectional views, showing a manufacturing process of the liquid crystal display device of FIG. 1;

FIG. 11 is a graph, showing dependence of the optical response of a liquid crystal composition on transmission-hole pitch;

FIG. 12 is a view, useful in explaining the operation of a liquid crystal display device according to the invention;

FIG. 13 is a view, useful in explaining the operation of another liquid crystal display device according to the invention;

DETAILED DESCRIPTION OF THE PREFERRED EMBODIMENTS

The embodiments of the invention will now be explained in detail with reference to the accompanying drawings.

Figure 1:
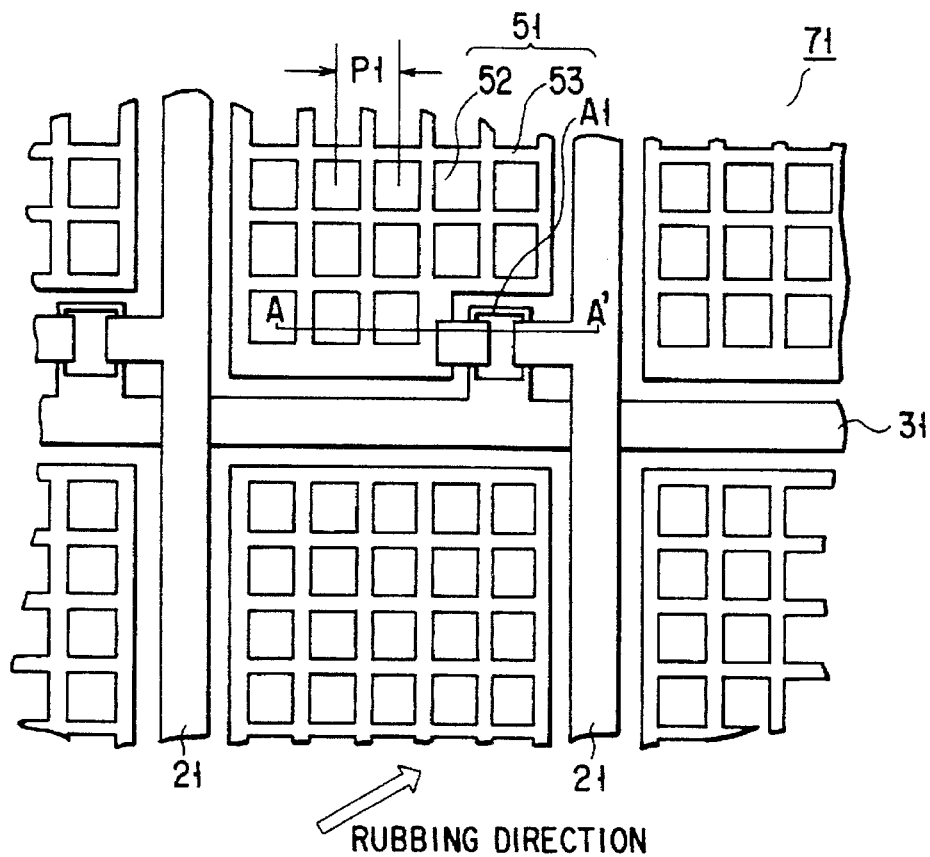
FIG. 1 is a schematic front view, showing a matrix array substrate employed in a liquid crystal display device according to a first embodiment of the invention.
Figure 2:
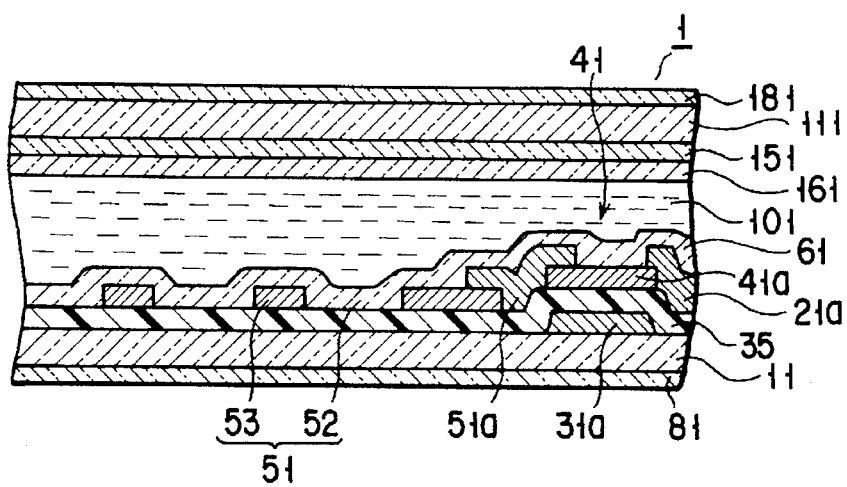
FIG. 2 is a schematic cross-sectional view, taken along line A—A' in FIG. 1.

FIG. 1 is a schematic view of a matrix array substrate 71 of a liquid crystal display device 1 according to a first embodiment of the invention. FIG. 2 is a cross-sectional view taken along line A—A' in FIG. 1.

As is shown in FIGS. 1 and 2, a plurality of signal lines 21 and a plurality of scanning lines 31 electrically isolated from the signal lines 21 are provided in the form of matrix on a transparent glass substrate 11. A thin film transistor 41 consisting of an amorphous silicon (a-Si) film is formed on each intersection of the lines 21 and 31. Each signal line 21 is connected, via a channel region 41a of the thin film transistor 41, to a pixel electrode 51 consisting of a shading conductor or light shield conductor 53 with light-transmitting holes 52. As is shown in FIG. 2, the thin film transistor 41 has a structure in which a gate electrode 31a extending from the scanning line 31 is coated with an insulating film 35, the amorphous silicon (a-Si) film 41a is formed on the insulating film 35, and a drain electrode 21a and a source electrode 51a extend from the signal line 21 and pixel electrode 51 onto the amorphous silicon film 41a, respectively. The shading conductor 53 consists of an a-Si film which prevents light rays to pass therethrough or attenuates the light rays, and has square light-transmitting holes 52 arranged with a pitch (P1) of 15 μm to allow the light rays to pass therethrough. Thus, the shading conductor 53 is formed such that a plurality of stripe electrodes having a width of approx. 4 μm intersect each other.

An orientation film 61 having been rubbed in a predetermined direction is provided on the shading conductor 53, thus forming the matrix array substrate 71.

A common electrode 151 and an orientation film 161, which consist of I.T.O. films, are formed on a transparent glass substrate 111, thus forming a counter electrode substrate 171.

A liquid crystal composition 101 is held with a pitch of 15 μm between the pixel electrode 51 and common electrode 151 constructed as above, and polarization plates 81 and 181 are provided on the outer surfaces of the matrix array substrate 71 and counter electrode substrate 171, respectively, thus forming the liquid crystal display device 1. If the pitch of holding the composition 101 is made 5–10 μm, the composition 101 in the hole 52 can have a high responsiveness.

Then, a method of forming the liquid crystal display device 1 of the first embodiment will be explained with reference to FIGS. 3A to 3D. First, as is shown in FIG. 3A, a tantalum (Ta) film having a thickness of 3000 Å is formed on the transparent glass substrate 11 by sputtering. Then, the scanning lines 31 and gate electrodes 31a connected thereto are formed on the substrate 11 by photoetching.

Thereafter, as is shown in FIG. 3B, the SiOx insulating film 35 having a thickness of 3500 Å is formed on the resultant structure, and subsequently an a-Si film having a thickness of 2000 Å and to be used as the channel region 41a of the thin film transistor 41 is formed by plasma CVD then patterned, thereby forming the channel region 41a and the pixel electrode 51 consisting of the shading conductor 53 and light-transmitting holes 52 formed therein and arranged with a line width of 4 μm and a pitch (P1) of 15 μm. It is most preferable to make more than 2000 Å the thickness of the shading conductor 53 consisting of the a-Si film, in consideration of a reduction in the resistance of the electrode.

Subsequently, an aluminum (Al) film having a thickness of 5000 Å is formed by sputtering, and is patterned as shown in FIG. 3C, thereby forming the drain electrode 21a connecting the signal line 21 to the channel region 41a of the thin film transistor 41, and the source electrode 51a connecting the pixel electrode 51 to the channel region 41a.

Then, as is shown in FIG. 3D, the orientation film 61 is provided on the resultant structure, and is rubbed in a predetermined direction, thereby forming the matrix array substrate 71.

The shading conductor 53 may be made of a metal, an alloy, an amorphous substance, or a polycrystalline substance. In particular, aluminum (Al) and tantalum (Ta), which have a high conductivity and can be patterned easily, are preferable among metals, and amorphous silicon (a-Si) and polysilicon (p-Si), which can be produced easily and uniformly, are preferable among amorphous polycrystalline substances.

According to the liquid crystal display device 1 of the first embodiment, the pixel electrode 51 consists of the shading conductor 53 made of an a-Si film and having light-transmitting holes 52 arranged with a predetermined pitch, so that the amount of a rare metal, indium (In), to be used can be reduced. Further, the monochrome liquid crystal display device 1 has a light transmittance of 17%, which value is substantially equal to that obtained in the case of forming the pixel electrode 51 by an I.T.O. film. In addition, using the a-Si film as the conductor 53 can considerably reduce its resistance at the time of radiation of light, which means that the a-Si film is very advantageous as an electrode material.

Moreover, in the device 1 of the first embodiment, the pixel electrode 51 can be formed in the same process as the channel region 41a of the thin film transistor 41, so that the manufacturing cost can be reduced as compared with the case of forming the pixel electrode 51 in a different process from the channel region 41a.

Figure 4:
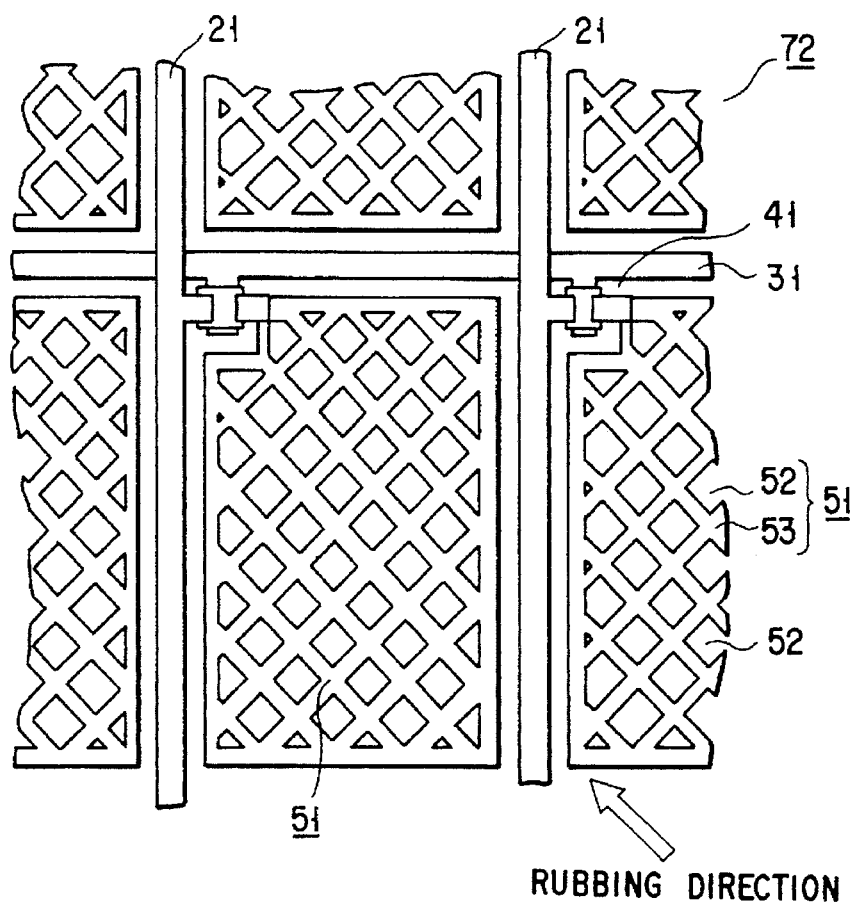
FIG. 4 is a schematic front view, showing a matrix array substrate of a liquid crystal display device according to a modification of the first embodiment of FIG. 1.

Further, although in the first embodiment, the direction of each edge of the light-transmitting hole 52 of the shading conductor 53 is not parallel with the line of the direction in which the orientation film 61 is rubbed, it is preferable to form a matrix array substrate 72 having pixel electrodes 51 with light-transmitting holes 52 each arranged such that two edges thereof are located in a direction corresponding to the rubbing direction of the orientation film 61, as is shown in FIG. 4.

By employing the thus-constructed matrix array substrate 72 in the liquid crystal display device, the number of those edges of the holes 52 which are not parallel with the line of the rubbing direction is reduced, thereby causing no orientation defects, and providing a display image having a high effective contrast ratio.

Figure 5:
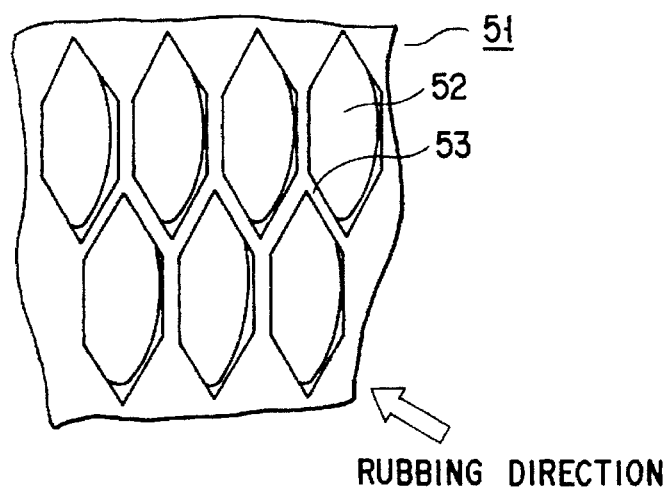
FIG. 5 is a schematic enlarged front view, showing part of a matrix array substrate of a liquid crystal display device according to another modification of the first embodiment of FIG. 1.

The shape of the light-transmitting hole 52 formed in the shading conductor 53 is not limited to a square, but may be a hexagon, as shown in FIG. 5. Also in this case, no orientation defects occur, and a display image of a high effective contrast ratio can be obtained.

Figure 6:
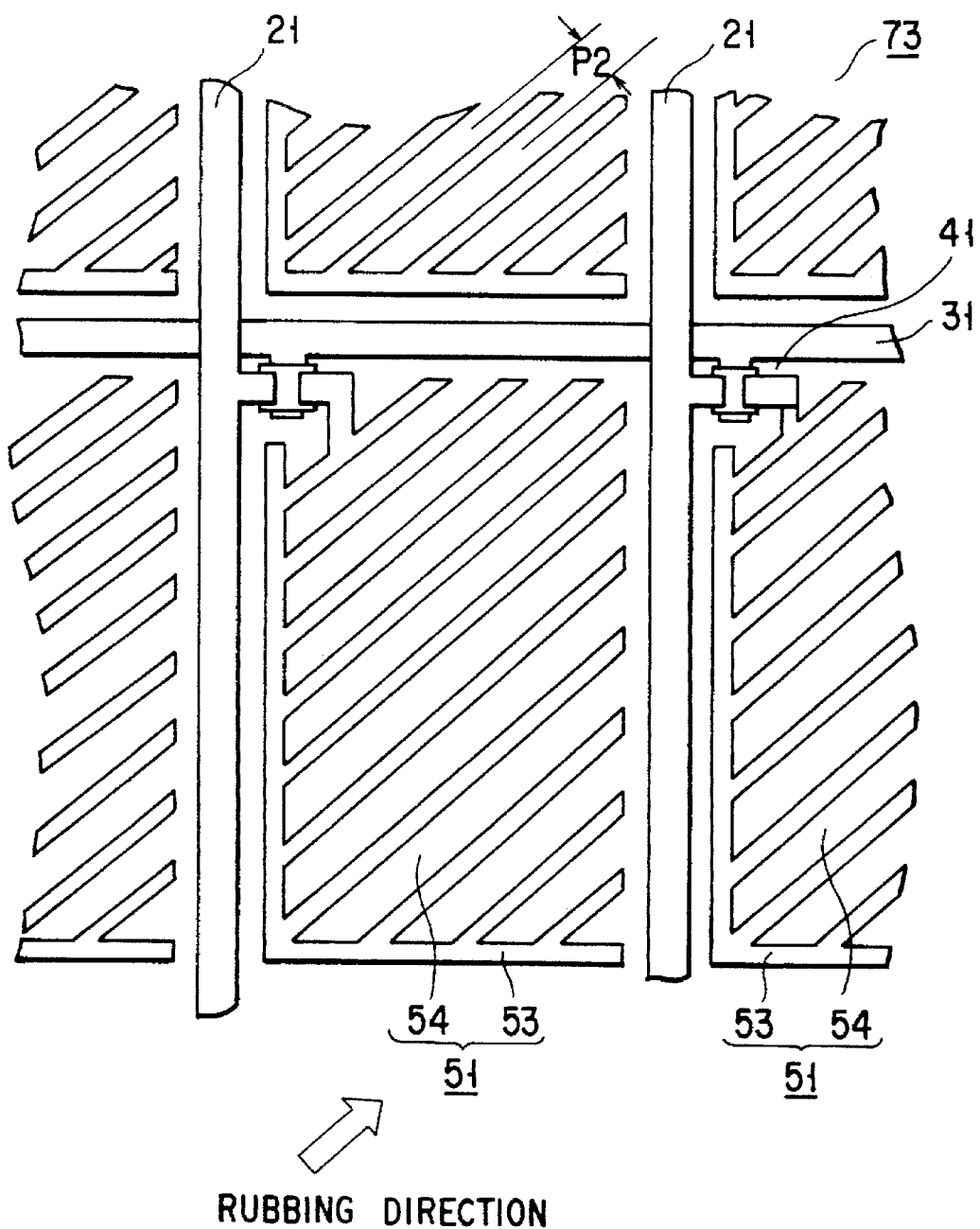
FIG. 6 is a schematic front view, showing a matrix array substrate of a liquid crystal display device according to a further modification of the first embodiment of FIG. 1.

In addition, although in the first embodiment and modifications, each pixel electrode 51 consists of the shading conductor 53 and the light-transmitting holes formed therein, a matrix array substrate 73 may be formed which employs pixel electrodes 51 each consisting of a shading conductor 53 and light-transmitting slits 54 formed therein, as is shown in FIG. 6.

In this case, a plurality of slits 54 are formed in the shading conductor 53 of an a-Si film, in the rubbing direction with a slit pitch (P2) of 15 μm, and the pixel electrodes 51 are electrically connected to the source electrode 51a. The line width of the shading conductor 53 is 4 μm.

In such a liquid crystal display device as employs the matrix array substrate 73, a liquid composition appearing through the shading conductor 53 could show a good optical response through the shading conductor 53, and provide a display image as superior as that obtained in the above-described embodiment.

Also in this case, the ratio of the open areas of the pixel electrode 51 to the shaded areas of the same could be enhanced from 17% to 25%, as compared with the case of arranging the light-transmitting hole 52 in the a-Si shading conductor 3 in the form of a matrix.

In the first embodiment and modification, the shading conductor 53 is formed by an a-Si film, which may provide an overall reddish display image since the a-Si film has the property of transmitting red light. However, a good display image can be obtained by adjusting the wavelengths of the light source or restraining red light with the use of a filter or the like.

The shading conductor 53 can be made of a material other than the a-Si film. For example, it may be formed integral with the source electrode 51a of the thin film transistor 41. This enables a liquid crystal display device to be produced without increasing the number of manufacturing steps.

Then, a liquid crystal display device 3 according to a second embodiment of the invention will be explained with reference to FIGS. 7 to 9D. In these figures, elements corresponding to those in the first embodiment are denoted by corresponding reference numerals.

Figure 7:
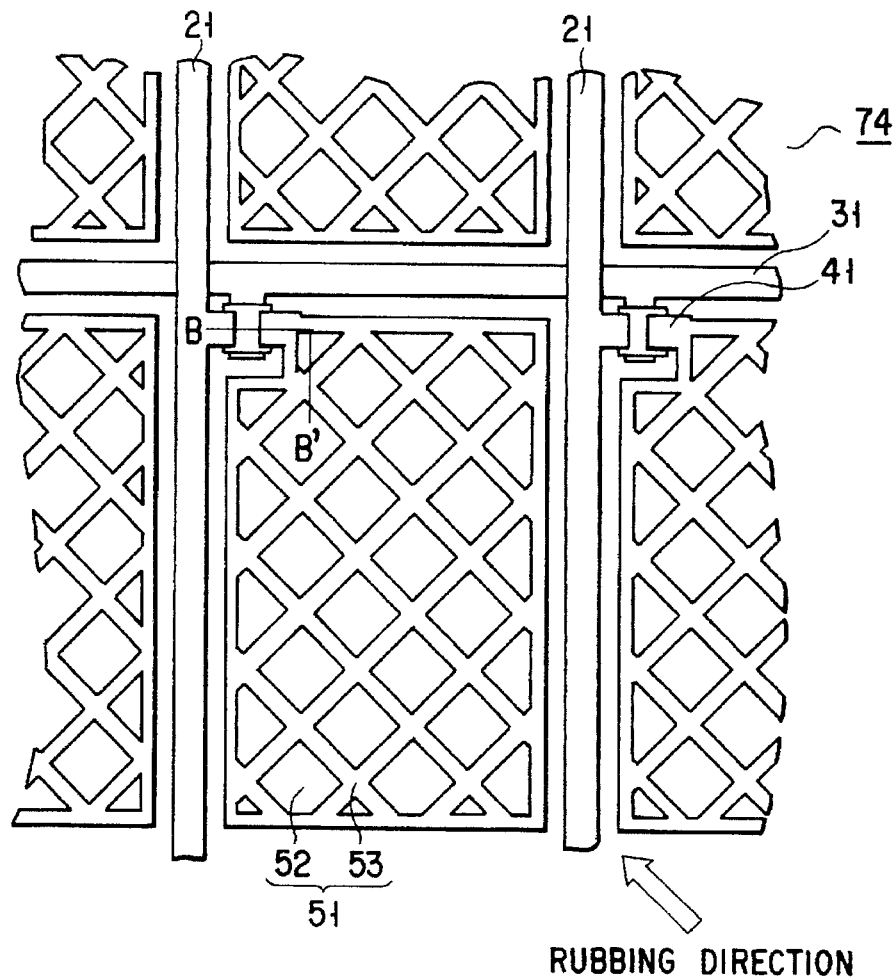
FIG. 7 is a schematic front view, showing a matrix array substrate employed in a liquid crystal display device according to a second embodiment of the invention.
Figure 8:
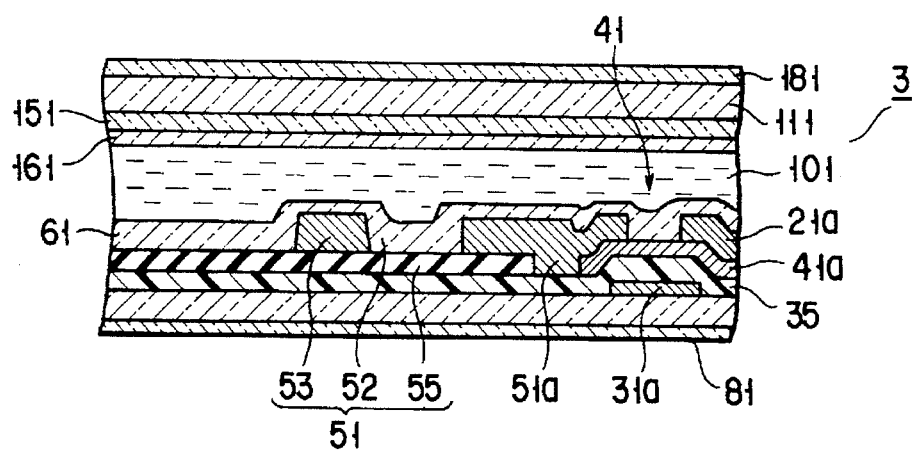
FIG. 8 is a schematic cross-sectional view, taken along line B—B' in FIG. 7.

FIG. 7 is a schematic view, showing a matrix array substrate 74 employed in the liquid crystal display device 3, while FIG. 8 is a schematic cross sectional view taken along line B—B" in FIG. 7.

A plurality of signal lines 21 and scanning lines 31 are arranged in the form of a matrix on a transparent glass substrate 11. A thin film transistor 41 having the same structure as that shown in FIG. 2 is formed on each intersection of the lines 21 and 31. Each signal line 21 is connected to a pixel electrode 51 via the thin film transistor 41. As is shown in FIG. 8, the pixel electrode 51 consists of a transparent resistor 55 formed by a tantalum oxide film, a shading conductor 53 made of aluminum (Al) formed on the resistor 55, and a plurality of substantially square light-transmitting holes 52 formed in the conductor 53. The holes 52 are arranged with a hole pitch of 20 μm and a line width of 5 μm such that two edges of each hole 52 are parallel with the line of the rubbing direction of the orientation film 61.

A common electrode 151 and an orientation film 161, which are formed by I.T.O. films, are provided on the transparent glass substrate 11, thus forming a counter electrode substrate 171.

A liquid crystal composition 101 is held between the pixel electrode 51 and common electrode 151 with a pitch of 10 μm, and polarization plates 81 and 181 are provided on the outer surfaces of the matrix array substrate 74 and counter electrode substrate 171, respectively, thereby forming the liquid crystal display device 3.

A method of producing the liquid crystal display device 3 shown in FIGS. 7 and 8 will be explained briefly. As is shown in FIG. 9A, a tantalum (Ta) film having a thickness of 3000 Å is formed on the glass substrate 11 by sputtering, and then the scanning lines 31 and gate electrodes 31a connected to the electrodes 31 are formed by photoetching.

Figure 9A:
FIGS. 9A to 9D are cross-sectional views, showing a manufacturing process of the liquid crystal display device of FIG. 7.
Figure 9B:
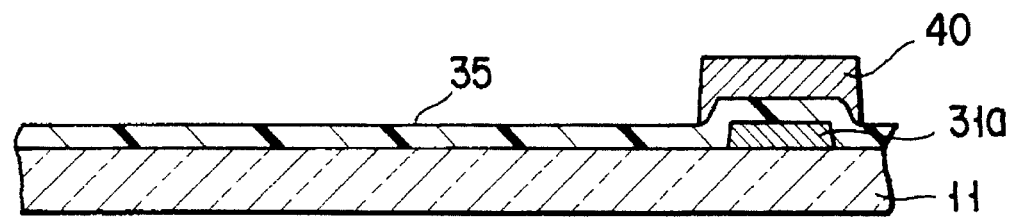

Thereafter, as is shown in FIG. 9B, the SiOx insulating film 35 having a thickness of 3500 Å is formed on the resultant structure, and subsequently an a-Si film having a thickness of 2000 Å and to be used as the channel region 41a of the thin film transistor 41 is formed by plasma CVD and then patterned, thereby forming the channel region 41a.

Figure 9C:
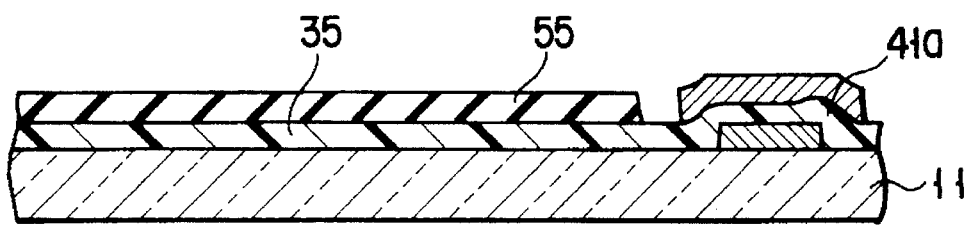
Figure 9D:
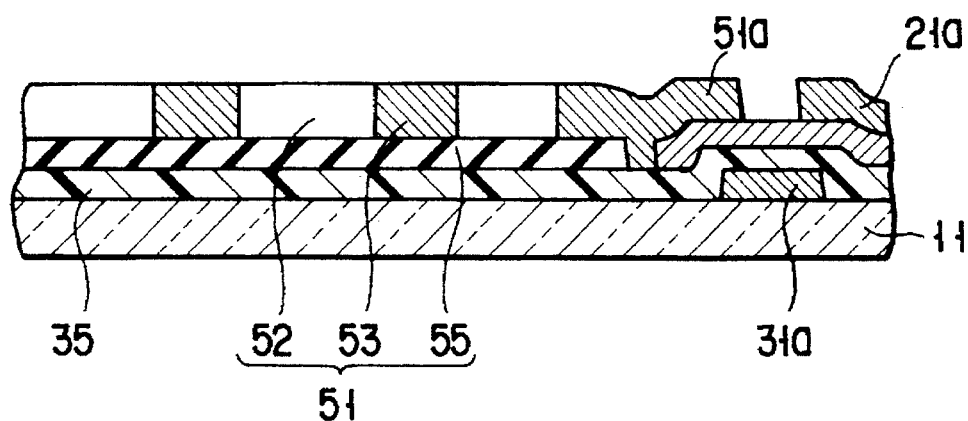

As is shown in FIG. 9C, in order to form the pixel electrode 51, a tantalum oxide film having a thickness of 1000 Å is formed on the resultant structure by sputtering, and then patterned to form a strip of the transparent resistor 55. Thereafter, an Al film having a thickness of 5000 Å is formed by sputtering and then patterned, thereby forming the drain electrode 21a connecting the signal line 21 to the thin film transistor 41, and forming the shading conductor 53 having the light-transmitting holes 52, integrally as one piece with the source electrode 51a connected to the transistor 41.

Thereafter, the orientation film 61 is provided on the resultant structure, and then rubbed in a direction substantially parallel with two edges of each light-transmitting hole 52, thus forming the matrix array substrate 74 (these steps are not shown in FIGS. 9A to 9C).

The amount of indium (In), a rare metal, used in the device could considerably be reduced, since the above-described liquid crystal display device 3 employed the pixel electrode 51 of a laminated structure consisting of the transparent resistor 55 made of a tantalum oxide film, and the shading conductor 53 made of an aluminum (Al) film and having the light-transmitting holes 52.

Further, though the liquid crystal display device 1 of the first embodiment had an optical transmittance of 17%, the display device 3 of the second embodiment had as much an optical transmittance as 25%, since the hole pitch of the device 3 was 20 μm, which was larger than that of the device 1, i.e., 15 μm.

Figure 10:
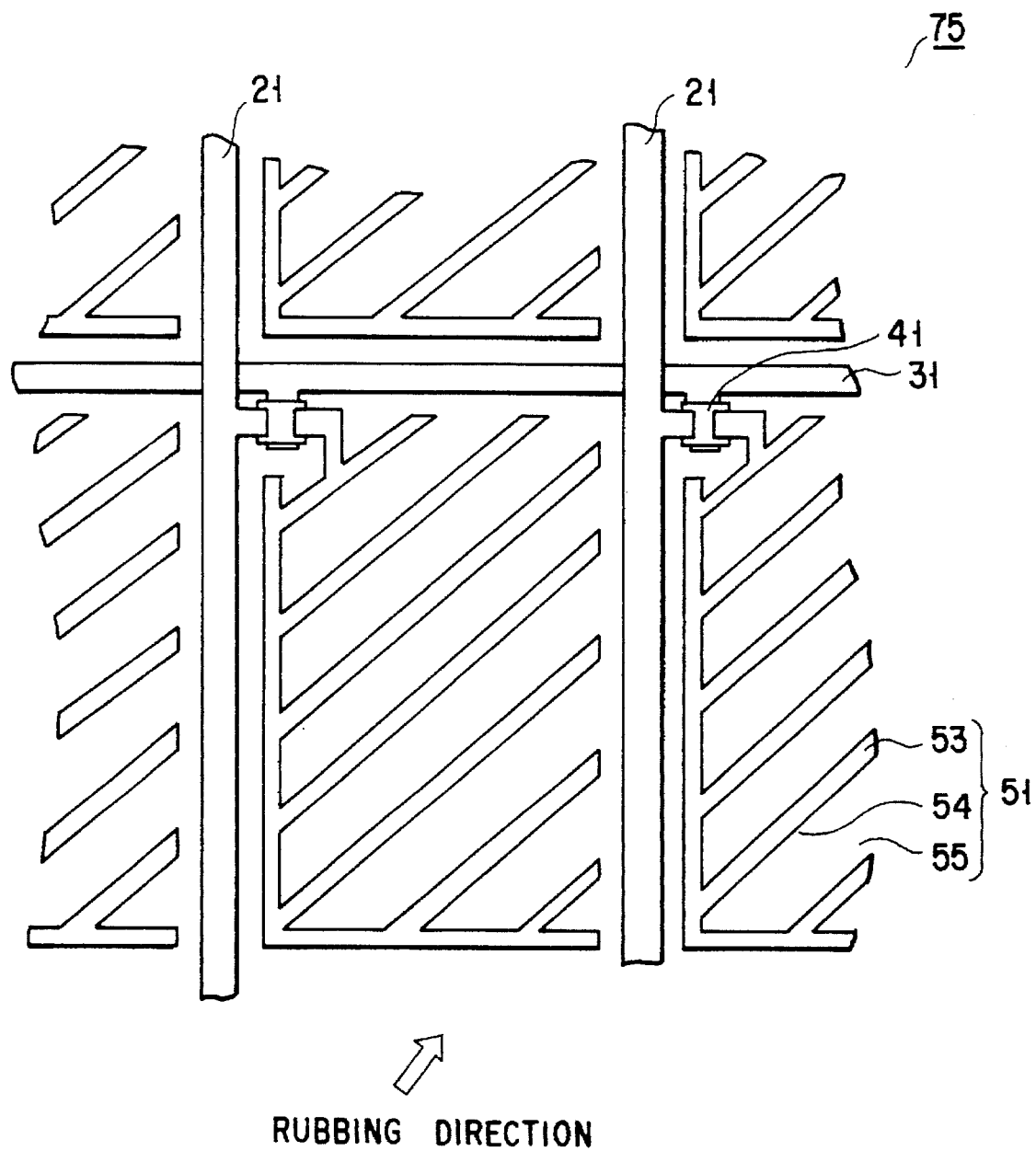
FIG. 10 is a schematic front view, showing a matrix array substrate of a liquid crystal display device according to a modification of the second embodiment of FIG. 7.

Though in the second embodiment, the shading conductor 53 consists of an aluminum film having a plurality of light-transmitting holes 52 formed therein, it may consist of an aluminum film having a plurality of light-transmitting slits 54 as shown in FIG. 10.

This structure could further enhance the opening ratio of each electrode, and hence enhance the light transmittance from 25% to 33%. Rubbing the orientation film 61 in a direction parallel with the light-transmitting slits 54 can prevent occurrence of an orientation defect, and provide superior display characteristics.

Although in the second embodiment, the shading conductor 53 consists of an aluminum film, it may consist of an a-Si film as in the first embodiment.

Also, though in the second embodiment, the transparent resistor 55 consists of a tantalum oxide film, it may consist of any one of metal oxides having different light transmittances, such as zinc oxide, molybdenum oxide, tungsten oxide. It is preferable to use a volume resistance of $10$–$10^6$ Ωcm in order to obtain a satisfactory effect.

Furthermore, though in the second embodiment, the pixel electrode 51 consists of the transparent resistor 55 and the shading conductor 53 laminated on the upper surface of the resistor 55, the resistor 55 may be laminated on the upper surface of the shading conductor 53. In the latter case, the unevenness of the surface of the pixel electrode 51 can be reduced, and occurrence of a defect in the orientation of the orientation film 61 can be minimized.

As is described above, in the liquid crystal display device of the invention, the pixel electrode 51 is formed by a shading conductor having light-transmitting holes or slits. These holes or slits enable the electrode formed by a shading conductor to have a satisfactory light transmittance. It could be confirmed that a liquid crystal composition appearing through the light-transmitting holes or slits can show sufficient optical response.

The reason why the liquid crystal composition appearing the light-transmitting holes or slits shows sufficient optical response is not exactly understood. However, it is presumed that this phenomenon is caused by lines of electric force and accumulated electric charge.

FIG. 11 is a graph, taking a hole pitch along the abscissa and along the ordinate the ratio of optical response of that part of a liquid crystal composition which contacts an insulating area of a square light-transmitting hole. In FIG. 11, curve (a) indicates the relationship between the hole pitch and the ratio of optical response when the device is driven at a response speed of 50 msec, curve (b) when the device is driven at a response speed of 100 msec, and curve (c) when the device is driven at a response speed of 200 msec.

The pitch of the light-transmitting holes or slits indicates the distance between points corresponding to the gravity centers of each adjacent pair of light-transmitting holes or slits.

As can be understood from FIG. 11, particularly where the hole pitch is 15 μm or less, the optical response of the liquid crystal composition is more than 60%, even if the device is driven at a high response speed of 50 msec.

In consideration of this, actually it is preferable to set the hole or slit pitch to 5–40 μm, and more preferable to set it to 5–15 μm. If the pitch is less than 5 μm, the accuracy at which the shading conductor is patterned will lower, which may cause a breakage in wiring or a defect in holes or slits. On the other hand, if the pitch is more than 40 μm, the ratio of the optical response of the liquid crystal composition will lower, which may make it impossible to obtain good display images.

The line width between each adjacent pair of the light-transmitting holes or slits is preferably adjusted so as to maximize the opening ratio of each electrode. The ratio can be made more than 60% with ease if the line width between the slits is set to 5 μm or less.

As regards the location of the light-transmitting hole or slit, it is preferable to locate the hole such that at least two edges thereof are substantially parallel with the line of the rubbing direction, or to locate the slit substantially parallel with the line of the rubbing direction. This location can reduce the number of those edges of the shading conductor which cross the line of the rubbing direction at an angle, thereby causing no orientation defects.

The above effect of the appropriate location of the hole or slit will be explained in more detail with reference to FIGS. 12 and 13. In a case where each pixel electrode provided on the matrix array substrate of a liquid crystal display device consists of a shading conductor 601 having square light-transmitting holes 611 arranged such that a diagonal of each hole is parallel with the line of the rubbing direction, as is shown in FIG. 13, an orientation defect will occur in that portion 621 in the vicinity of the outline of the shading conductor 601, which is located at an angle to the line of the rubbing direction. This seems because the thickness of the orientation film in a region wherein the shading conductor 601 exists differs from the thickness of the same in a region wherein no shading conductor exists, and therefore a satisfactory rubbing treatment cannot be made to the orientation film in the portion 621 in the vicinity of the outline of the shading conductor 601.

On the other hand, as is shown in FIG. 12, where a shading conductor 701 having light-transmitting holes 711 is constructed such that at least two edges of each hole 711 are substantially parallel with the line of the rubbing direction, that portion 721 in the vicinity of the outline of the conductor 701 which is located at an angle to the line of the rubbing direction can be minimized, thereby minimizing the orientation defect.

Although in the above-described embodiments and modifications, each pixel electrode in the active matrix type liquid crystal device is formed by a shading conductor having light-transmitting holes or slits, the common electrode opposed to the pixel electrodes may be formed by the shading conductor having light-transmitting holes or slits.

Figure 14:
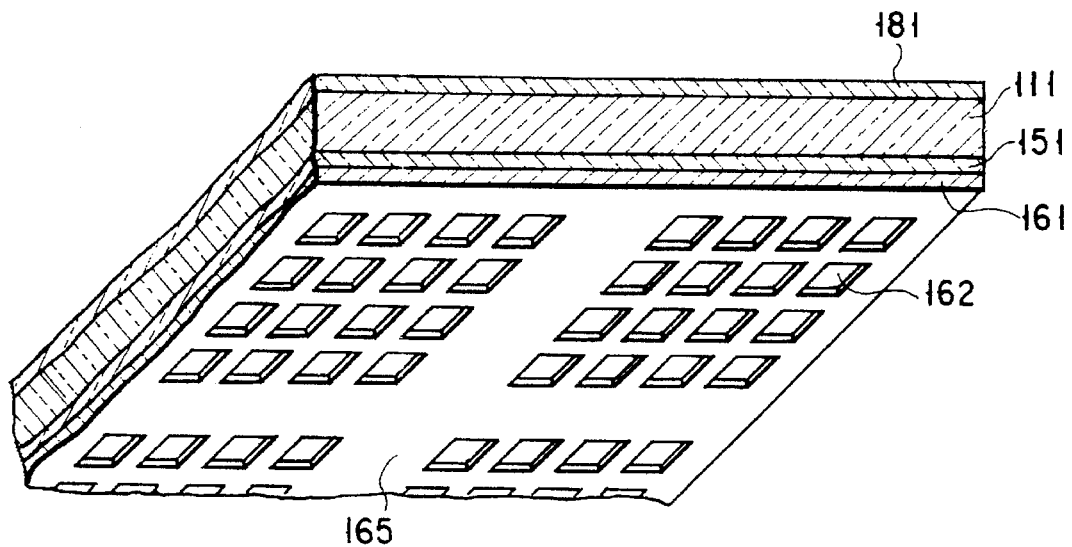
FIG. 14 is a schematic perspective view of a counter electrode substrate of a liquid crystal display device according to the invention.

For example, FIG. 14 is a schematic perspective view of the counter electrode substrate.

A common electrode 161 is made of Cr, and has regions aligned with the pixel electrodes and having square light-transmitting holes 162 arranged as in the aforementioned embodiments. In this common electrode 161, a region 165 between two groups of the light-transmitting holes can positively be used as a black matrix, since it is not transparent. Accordingly, without any particular black matrix, undesirable light can be prevented from being radiated onto thin film transistors, thereby obtaining a good display image.

Further, where the common electrode is formed by a shading conductor, light may reflect on the shading conductor, causing undesirable light radiation onto thin film transistors. To avoid this, the shading conductor may be blacken, or in the case of performing color display, a color filter may be provided on the common electrode.

Figure 15:
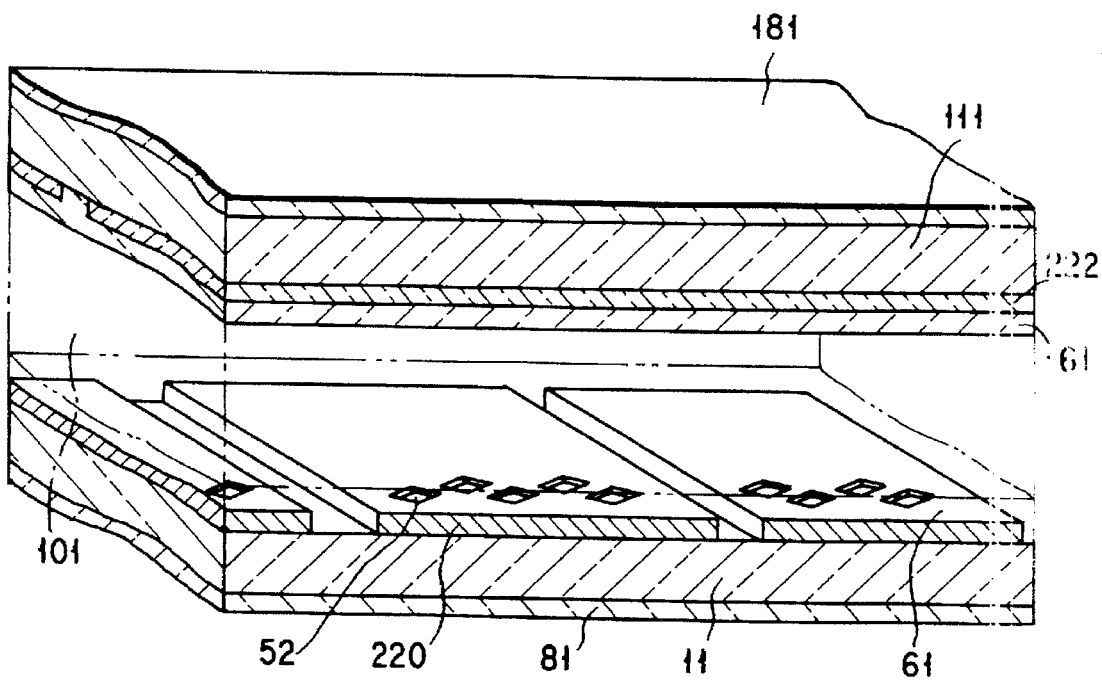
FIG. 15 is a schematic cross sectional view, showing a simple matrix type liquid crystal display device according to a further embodiment of the invention.

Although in the above-described embodiments and modifications, the invention is applied to active matrix type liquid crystal devices, it is also applicable to a simple matrix type liquid crystal device as shown in FIG. 15, in which stripe electrodes 220 are formed on a glass substrate 11, extending substantially parallel with one another in the Y direction of X-Y coordinates, and stripe electrodes 222 are formed on a glass substrate 111, extending substantially parallel with one another in the X direction. In this case, a structure in which at least one stripe electrode 220 or 222 is formed by a stripe conductor having light-transmitting holes 52 or slits 54 can reduce the amount of indium (In), a rare metal, used in the device, without lowering the light transmittance. Preferably, the light-transmitting holes or slits are provided only in a region in which a pair of stripe electrodes are overlapped to form display pixels, in consideration of the resistances of the electrodes. The same can be said of a common electrode employed in an active matrix type liquid crystal display device.

In FIG. 15, reference numerals corresponding to those in other figures denote corresponding elements, and explanation of the elements is omitted.

In the liquid crystal display device of FIG. 15, at least one of the electrodes 220 and 222 may be formed by a shading conductor having light-transmitting holes or slits, and a transparent resistor member laminated on the conductor and having a resistance higher than the same. By virtue of this laminated structure, the size of the hole or slit can be made as large as about 40 μm. Thus, the opening ratio of each electrode can be further enhanced without reducing the response speed of the device.

Figure 16:
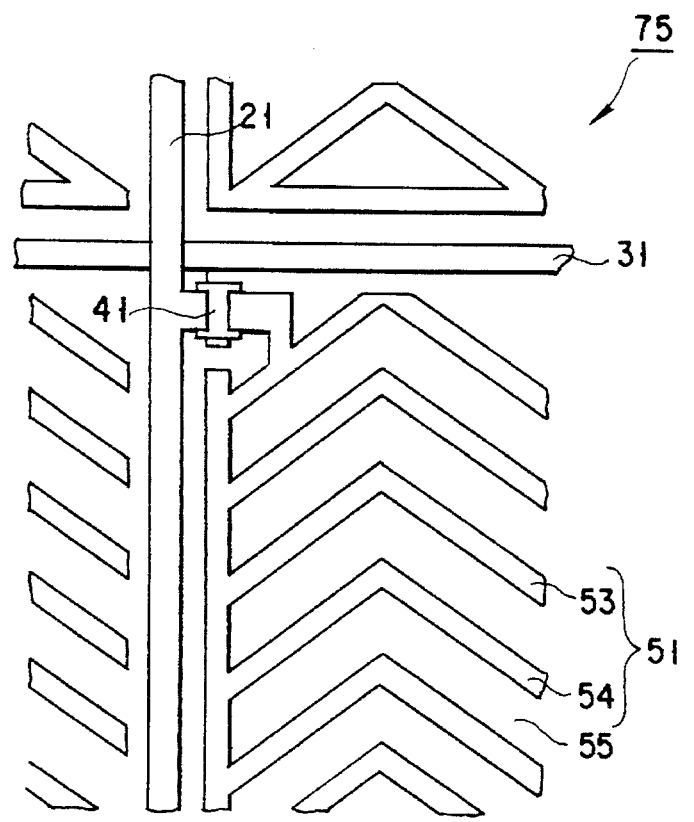
FIG. 16 is a schematic front view, showing a matrix array substrate of a liquid crystal display device according to a yet another modification of the embodiment of the invention.

The above-described active or simple matrix type liquid crystal device has light-transmitting holes or slits of a predetermined size regularly arranged with a predetermined pitch. However, this may be modified such that slits extend in more than one directions in a pixel electrode, as shown in FIG. 16. This arrangement of slits causes the liquid crystal composition on the pixel electrode to be oriented in different directions, thereby causing different operations of the composition. Therefore, the modification provides an improvement in visual field.

As is explained above in detail, the liquid crystal display device of the invention employs a small amount of indium (In), a rare metal, and has a high light transmittance.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal display device having a plurality of pixel elements which are arranged in an array for controlling light rays, respectively, comprising:

a first substrate;

a first electrode structure formed on the first substrate, the first substrate having first surface regions arranged in the array;

a second substrate positioned opposing the first substrate with a gap interposed therebetween;

a second electrode structure having second surface regions which are arranged in the array and which oppose the first surface regions, one of the first and second electrode structures being fabricated from a material for preventing the light rays from passing through corresponding surface regions, and having an opening structure with a plurality of openings corresponding to each pixel element for passing the light rays therethrough, the openings having a pitch being in the range from 5 µm to 40 µm; and a liquid crystal composition filled in the gap between the first and second substrates, the pixel elements being defined by the liquid crystal composition, the first and the second surface regions.

2. A liquid crystal display device comprising:

a first substrate;

a second substrate opposed to the first substrate with a gap defined therebetween; and a plurality of pixel elements arranged in an array that is positioned between the first and second substrates, the pixel elements controlling passage of incident light rays, each pixel element including:

a first electrode structure positioned on the first substrate and having a first electrode pixel region;

a second electrode structure positioned on the second substrate and having a second electrode pixel region opposed to the corresponding first electrode pixel region;

a pixel electrode structure included in at least one of the first and second electrode structures, the pixel electrode structure preventing light rays from passing through the first electrode pixel region when included in the first electrode structure, the pixel electrode structure serving as a shade preventing light rays from passing through the second electrode pixel region when included in the second electrode structure, the pixel electrode structure having a plurality of openings through which light rays pass therethrough, the openings having a pitch ranging from 5 µm to 40 µm, the pitch being greater than the gap defined between the first and second substrates; and a liquid crystal composition between the first and second substrates.

3. A liquid crystal display device according to claim 2, wherein the pixel electrode structure includes a pixel electrode layer and a transparent resistor layer, the transparent resistor layer having a resistance higher than a resistance of the pixel electrode layer.

4. The liquid crystal display device according to claim 2, further comprising a first orientation film formed on the pixel electrode structure and rubbed in a first direction, and wherein each of the openings formed in the pixel electrode structure has two edges substantially parallel with the line of the first direction.

5. The liquid crystal display device according to claim 2, wherein each of the openings extends in a predetermined direction like a slit.

6. The liquid crystal display device according to claim 2, wherein the pitch ranges from 5 µm to 15 µm.

7. The liquid crystal display device according to claim 2, wherein the openings are arranged having a pitch ranging from 10 µm to 20 µm.

8. An active matrix type liquid crystal display device comprising:

a first substrate;

a second substrate opposed to the first substrate with a gap defined therebetween;

switching elements arranged in an array on the first substrate, each switching element including a gate electrode, an insulating layer positioned on the gate electrode, a semiconductor layer positioned on the insulating layer, a source electrode and a drain electrode;

a plurality of scanning lines arranged on the first substrate substantially parallel with one another and connected to corresponding gate electrodes of the switching elements;

a plurality of signal lines arranged substantially parallel with one another, electrically insulated from the scanning lines and the gate electrodes of the switching elements and connected to corresponding drain electrodes of switching elements;

pixel electrode structures arranged in the array on the first substrate, electrically insulated from the signal and scanning lines, each pixel electrode structure including a display electrode layer which serves as a shade preventing the light rays from passing and which has a plurality of openings through which light rays may pass, the openings having a pitch ranging from 5 µm to 40 µm, the pitch being greater than the gap defined between the first and second substrates;

a common electrode positioned on the second substrate, light rays passing through the common electrode; and a liquid crystal composition between the first and second substrates.

9. The liquid crystal display device according to claim 8, wherein each pixel electrode structure includes a pixel electrode layer and a transparent resistor layer, the transparent resistor layer having a resistance higher than a resistance of the pixel electrode layer.

10. The liquid crystal display device according to claim 8, further comprising a first orientation film formed on the pixel electrode structures and rubbed in a first direction, wherein each of the openings in the pixel electrode structures has two edges substantially parallel with the first direction.

11. The liquid crystal display device according to claim 8, wherein each of the openings extends in a predetermined direction like a slit.

12. The liquid crystal display device according to claim 8, wherein the openings are arranged having a pitch ranging from 10 μm to 20 μm.

13. The liquid crystal display device according to claim 8, wherein the pitch ranges from 5 μm to 15 μm.

14. A liquid crystal device comprising:
a first substrate;
a second substrate opposed to the first substrate with a gap interposed therebetween; and
a plurality of pixel elements arranged in an array, each of the pixel elements being formed between the first and second substrates to control passage of corresponding light rays, each pixel element including:
a first electrode structure formed on the first substrate and having a first electrode pixel region;
a second electrode structure formed on the second substrate and having a second electrode pixel region opposed to the corresponding first electrode pixel region, at least one of the first and second electrode structures comprising a pixel electrode structure including a pixel electrode layer mainly composed of amorphous silicon, the pixel electrode structure preventing light rays from passing through the first electrode pixel region when included in the first electrode structure, the pixel electrode structure serving as a shade preventing light rays from passing through the second electrode pixel region when included in the second electrode structure, said pixel electrode structure having plurality of openings for allowing the light rays to pass therethrough, the openings having a pitch being in the range from 5 μm to 40 μm, and
a liquid crystal composition filled in the gap between the first and second substrates.

15. The liquid crystal display device according to claim 14, wherein the switching element is a thin film transistor having an amorphous silicon film as same as the pixel electrode layer.

16. A liquid crystal display device comprising:
a first substrate;
a second substrate opposed to the first substrate; and
a common electrode structure positioned between the first and second substrate and having a first electrode pixel region;
a plurality of pixel elements arranged in an array that is positioned between the first substrate and the common electrode structure, the pixel elements controlling passage of incident light rays, each pixel element including:
a pixel element electrode structure positioned on the first substrate and having a second electrode pixel region opposed to the first electrode pixel region of the common electrode;
a pixel electrode structure included in at least one of the common electrode structure and the pixel element electrode structure, the pixel electrode structure preventing light rays from passing through the first electrode pixel region when included in the common electrode structure, the pixel electrode structure serving as a shade preventing light rays from passing through the second electrode pixel region when included in the pixel element electrode structure, the pixel electrode structure having a plurality of openings through which light rays pass therethrough, the openings having a pitch ranging from 5 μm to 40 μm, the pitch being greater than a gap defined between the pixel elements and the common electrode structure; and
a liquid crystal composition filled between the first and second substrates.

17. The liquid crystal display device according to claim 16, wherein the pixel electrode structure includes a pixel electrode layer and a transparent resistor layer, the transparent resistor layer having a resistance higher than a resistance of the pixel electrode layer.

18. The liquid crystal display device according claim 16, further comprising a first orientation film positioned on the pixel electrode structure and rubbed in a first direction, wherein each of the openings positioned in the pixel electrode structure has two edges substantially parallel with the first direction.

19. The liquid crystal display device according to claim 16, wherein each of the openings extends in a predetermined direction like a slit.

20. The liquid crystal display device according to claim 16, wherein the openings are arranged having a pitch ranging from 10 μm to 20 μm.

21. The liquid crystal display device according to claim 16, wherein the pitch is on the range from 5 μm to 15 μm.

22. An active matrix type liquid crystal display device comprising:
a first substrate;
a second substrate opposed to the first substrate;
switching elements arranged in an array on the first substrate, each switching element including a gate electrode, an insulating layer positioned on the gate electrode, a semiconductor layer positioned on the insulating layer, a source electrode and a drain electrode;
a plurality of scanning lines arranged on the first substrate substantially parallel with one another and connected to corresponding gate electrodes of the switching elements;
a plurality of signal lines arranged substantially parallel with one another, electrically insulated from the scanning lines and the gate electrodes of the switching elements and connected to the corresponding drain electrodes of the switching elements;
pixel electrode structures arranged in the array on the first substrate, electrically insulated from the signal and scanning lines, each pixel electrode structure including a display electrode layer which shades light rays and which has a plurality of openings through which light rays may pass, the openings having a pitch ranging from 5 μm to 40 μm;
a common electrode positioned on the second substrate, light rays passing through the common electrode, the pitch of the openings being greater than a gap defined between the pixel electrode structures and the common electrode; and
a liquid crystal composition positioned between the pixel electrode structures and the common electrode.

23. The liquid crystal display device according to claim 22, wherein each pixel electrode structure includes a pixel electrode layer and a transparent resistor layer, the transparent resistor layer having a resistance higher than a resistance of the pixel electrode layer.

24. The liquid crystal display device according to claim 22, further comprising a first orientation film positioned on the pixel electrodes and rubbed in a first direction, wherein each of the openings in the pixel electrode structures has two edges substantially parallel the first direction.

25. The liquid crystal display device according to claim 22, wherein each of the openings extends in a predetermined direction like a slit.

26. The liquid crystal display device according to claim 22, wherein the openings are arranged having a pitch ranging from 10 µm to 20 µm.

27. The liquid crystal display device according to claim 22, wherein the pitch ranges from 5 µm to 15 µm.

* * * * *